(12) United States Patent
DeWald, Jr. et al.

(10) Patent No.: US 6,371,702 B1
(45) Date of Patent: Apr. 16, 2002

(54) SPADE BLADE DRILL AND METHOD OF MAKING

(75) Inventors: A. Bruce DeWald, Jr., Martinez, GA (US); Fred T. Shallenberger, Rockford, IL (US)

(73) Assignee: Kennametal PC Inc., Monrovia, CA (US)

( * ) Notice: Subject to any disclaimer, the term of this patent is extended or adjusted under 35 U.S.C. 154(b) by 0 days.

(21) Appl. No.: 09/376,893

(22) Filed: Aug. 18, 1999

(51) Int. Cl.$^7$ .............................. B23B 51/02; B21K 5/04
(52) U.S. Cl. ...................... 408/227; 76/108.6; 408/228; 408/233; 408/713
(58) Field of Search .............................. 76/101.1, 108.1, 76/108.6; 408/199, 223, 227, 228, 230, 231, 233, 713; 451/48

(56) References Cited

U.S. PATENT DOCUMENTS

| | | |
|---|---|---|
| 571,253 A | 11/1896 | Wesselmann et al. |
| 1,069,930 A | 8/1913 | Down |
| 1,407,546 A | 2/1922 | Joseph |
| 4,047,826 A | 9/1977 | Bennett ........................ 408/59 |
| 4,060,335 A | 11/1977 | Holloway et al. .......... 408/233 |
| 4,115,024 A | 9/1978 | Süssmuth ................... 407/114 |
| 4,493,596 A | 1/1985 | Grunsky et al. ............. 408/233 |
| 4,605,347 A | 8/1986 | Jodock et al. ............... 408/224 |
| 4,620,822 A | 11/1986 | Haque et al. ................ 408/224 |
| 4,671,710 A | 6/1987 | Araki .......................... 408/145 |
| 4,687,387 A | 8/1987 | Roos ........................... 408/144 |
| 4,688,972 A | 8/1987 | Kubota ........................ 408/230 |
| 4,854,789 A | 8/1989 | Evseanko, Jr. .............. 408/125 |
| 5,078,554 A | 1/1992 | Kobota ........................ 408/230 |
| 5,154,549 A | 10/1992 | Isobe et al. .................. 408/144 |
| 5,423,640 A | 6/1995 | Lindblom et al. .......... 408/230 |
| 5,474,407 A | 12/1995 | Rödel et al. ................. 408/227 |
| 5,609,447 A | * 3/1997 | Britzke et al. ............... 408/230 |
| 5,716,172 A | 2/1998 | Nakamura et al. .......... 408/230 |
| 5,957,635 A | * 9/1999 | Nuzzi et al. ................. 408/713 |

FOREIGN PATENT DOCUMENTS

| | | | |
|---|---|---|---|
| DE | 2056091 | 10/1971 | |
| DE | 2646528 | * 4/1978 | ................. 408/713 |
| EP | 172148 | * 2/1986 | ................. 408/713 |

OTHER PUBLICATIONS

Brochure, Giddings & Lewis, "Stellram Unidrill Replaceable Insert Drills The Systematic Approach to Hole–Making.," Form St–1, Giddings & Lewis, Fond Du Lac, Wi, 1993.
Catalog, "Waukesha Drilling Products," Factory Supplies Company, Rockford, IL, 3/94.
Brochure, "T–A Drilling System Quick Delivery Specials QDS," Allied Machine & Engineering Corp., Dover, OH,#QDS–94–1, 1994, 1995.
Brochure, "T–A Metric Drilling System Drill Inserts and Holders," Allied Machine & Engineering Corp., Dover, OH,#95USAMC, May 1995.
Catalog, "Waukesha Drilling, Milling and Boring product Price List," Waukesha Cutting Tools, Inc., Waukesha, WI, Jul. 1, 1995.

* cited by examiner

Primary Examiner—Daniel W. Howell
(74) Attorney, Agent, or Firm—Larry R. Meenan

(57) ABSTRACT

A spade blade drill having blended open notch forms on either side of an apex. The notches transition into elliptical flutes which extend outwardly toward sides of the insert. The elliptical flute profiles inhibit chip curling and packing. The sides incorporate a pair of surfaces having a reduced clearance angle for preventing chip packing. The blended open notches are deep and extend across the entire width of the flutes, enhancing heat transfer surface area and allowing chips to flow along the entire flute surfaces. A plurality of chip splitters extend from the flutes across two relief surfaces. The chip splitters have a rounded profile, inhibiting chips from becoming hung in the splitters.

58 Claims, 6 Drawing Sheets

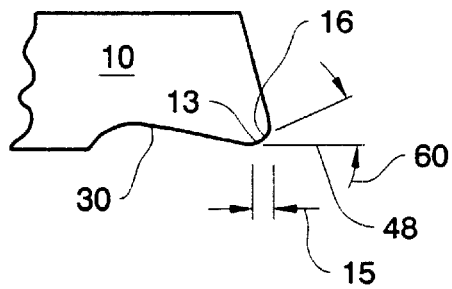
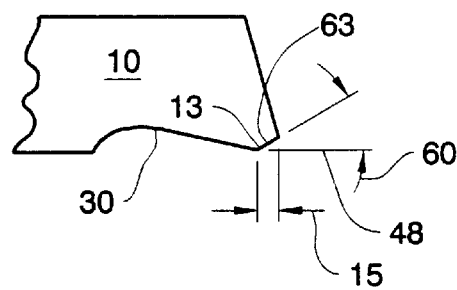
FIG. 8              FIG. 9
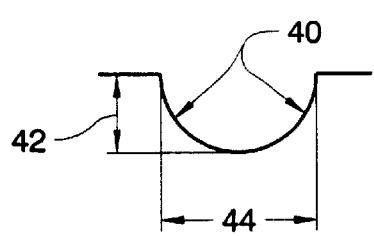
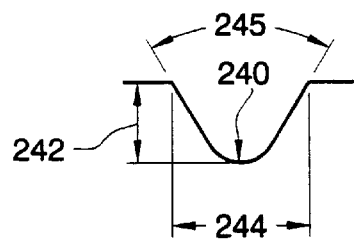
FIG. 10           FIG. 11
                  PRIOR ART

SPADE BLADE DRILL AND METHOD OF MAKING

FIELD OF THE INVENTION

The present invention relates generally to cutting tools for boring holes, and more particularly to a drill point geometry such as on a spade blade drill, and its method of manufacture.

BACKGROUND OF THE INVENTION

Spade blade drills are generally known in the art and use replaceable spade blade inserts to form the cutting edges of the drill point. Conventional inserts, or blades, may incorporate web-thinning notches on either side of a blade tip. The notches lead into flutes. Conventional inserts may use both primary and secondary relief surfaces to reduce or eliminate the chisel. Chip splitting grooves may be provided across the relief surfaces. Conventionally, the profile of the chip splitters is somewhat frusticonical with a generally circular valley. Slight variations in the dimensions or arrangement of the point geometry may have a significant affect on the drill life and performance.

SUMMARY OF THE INVENTION

The present invention provides a spade blade drill having an insert with a blended open notch form that intersects the back of the rake face and that is generally concave throughout the notch, back from the cutting edge, and a controlled notch lip length to notch hook length ratio, which leads to enhanced chip evacuation and a reduced heat flux due to an increased heat transfer surface area.

In one aspect of the present invention, the spade blade insert has a reduced clearance relief angle at its lands and elliptical profiled flutes and open round profiled chip splitters to reduce chip packing and curling.

These and other features and advantages of the invention will be more clearly understood from the following detailed description and drawings of preferred embodiments of the present invention.

BRIEF DESCRIPTION OF THE DRAWINGS

FIG. 8 is a view like FIG. 6 showing a rounded K-land hone.

FIG. 9 is a view like FIG. 6 showing a nominal K-land hone.

FIG. 10 is view taken in the direction of arrow X of FIG. 4 showing the chip splitter form of the insert.

FIG. 11 is a view like FIG. 10 of a conventional blade feature.

DETAILED DESCRIPTION OF THE INVENTION

Figure 1:
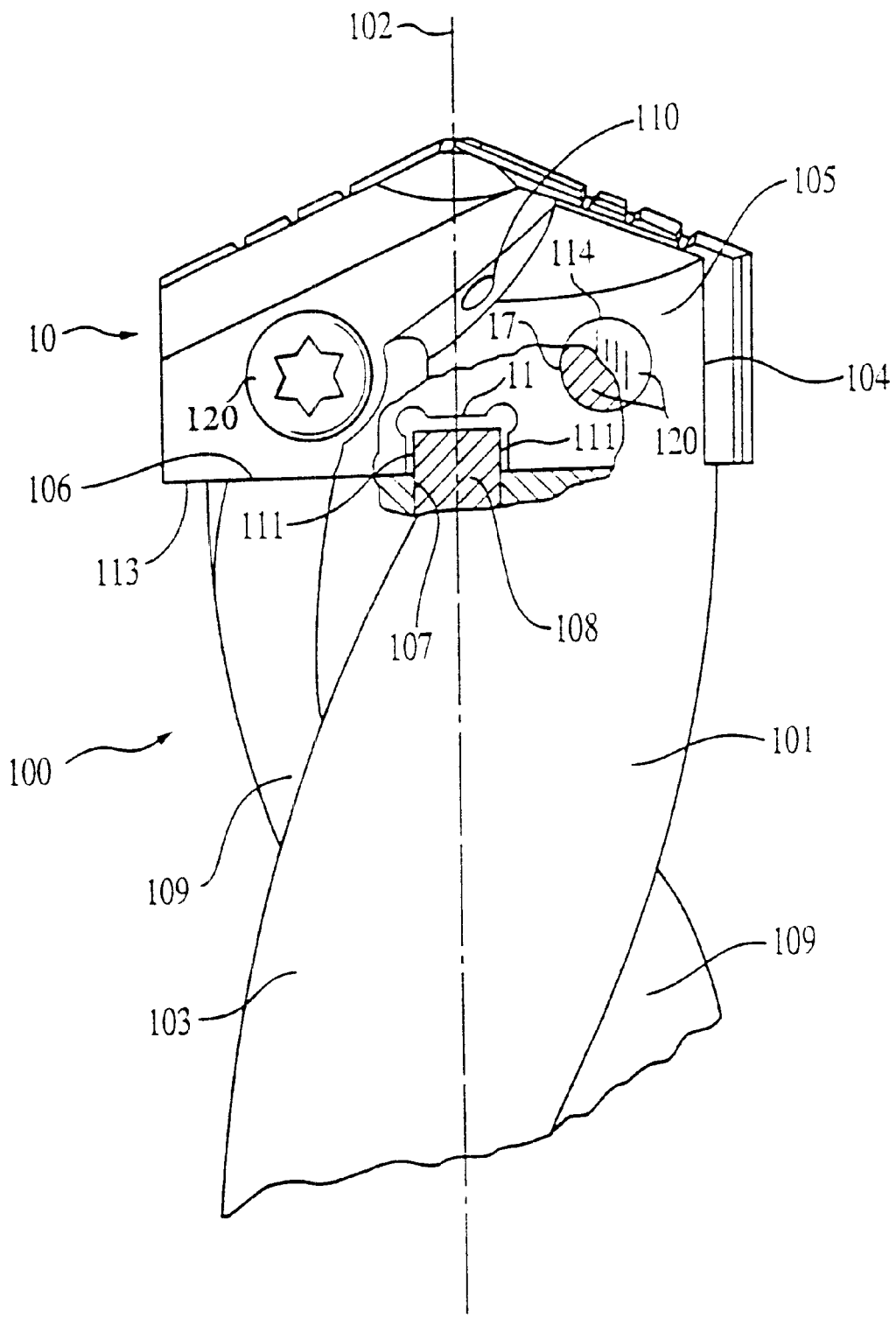
FIG. 1 is a partial cutaway side view of the tip of a spade blade drill assembly according to a preferred embodiment of the present invention.

Refer now to FIG. 1, there being shown a spade drill assembly, generally designated by reference numeral 100, according to a preferred embodiment of the present invention. Drill assembly 100 includes holder 101 and a removable spade blade insert, generally designated by reference numeral 10. The holder 101 is made from a longitudinally extending rod having a longitudinal axis of symmetry 102 and a shank portion (not shown) sized and shaped to be grasped by a twisting tool such as a machine tool. The holder 101 has a barrel portion 103 with two flutes 109 spiraling about the axis 102 and terminating at the point end 105 of the barrel 103. In another embodiment, the flute or flutes 109 may be parallel to the axis 102, or straight and not spiraling. The spade blade insert 10 is received in a slot 104 formed in the point end 105 of the holder 101.

The blade insert 10 includes the cutting surfaces for the tip of the drill 100 and is sized and shaped to extend out of the slot 104 in the axial and radial directions to engage and cut the work piece material. A locating pin 108 is received in a recess 107 formed in the bottom surface 106 of the slot 104. The pin 108 extends from the recess into the slot 104. The spade blade 10 includes a locating recess 11 formed in its bottom side 113 and sized to engage the locating pin 108 upon inserting the blade 10 in the recess 107. The recess 11 and the pin 108 are positioned to generally locate the blade 10 while it is inserted into the slot 104. The two threaded holding and alignment screws 120 extend through the two alignment holes 17 of the blade 10 and engage the two threaded bores 114 of the holder 101. The screws 120, the holes 17 and the bores 114 are sized and shaped to align the blade 10 with respect to the axis 102. In the embodiment illustrated, the pin 108 is slightly narrower than the blade recess 11 so that the blade 10 may be easily located in the holder slot 104 prior to alignment. Thus, upon alignment of the blade 10 using the screws 120, slight gaps 111 remain on one or both of the sides of the pin 108. In the event the blade 10 is subjected to extreme lateral forces that would tend to move the blade 10 out of position in the holder slot 104, the recess 11 may be consequently moved to close any gap 111 and urge the blade 10 against the pin 108. In this way, the pin 108 may reinforce the alignment screws 120 against shear or other damage due to such forces. While the bores and the holes are in axial alignment with respect to axis 102 to thereby align the axis 49 (FIG. 2) of the blade 10 with the axis 102, the bores may be slightly out of longitudinal alignment with the holes so that when the screws are tightened, the blade 10 is urged to seat its bottom surface 113 against the bottom surface 106 of the holder slot 104. The screws 120 and blade holes 17 may be formed with mutually engaging beveled surfaces, such as beveled surfaces 117 of the blade 10 (FIG. 2), to aid in assembly and alignment.

The alignment arrangement of the illustrated embodiment is advantageous over other alignment arrangements that use screws to urge a blade recess laterally against a pin in order to achieve alignment. In such other arrangements, the screw is continuously subjected to lateral shear forces in order to achieve the alignment of the blade. Thus, when additional extreme lateral forces are experienced, those additional forces may be added to the existing forces. Also the gap may be relatively large between the pin and the blade recess on the non-engaging side of the pin. A large gap requires more displacement of the blade to close the gap before the pin can reinforce the screw. Thus, in such alignment arrangements, it may be more likely that the screw will be damaged by extreme lateral shear forces experienced in use.

Figure 2:
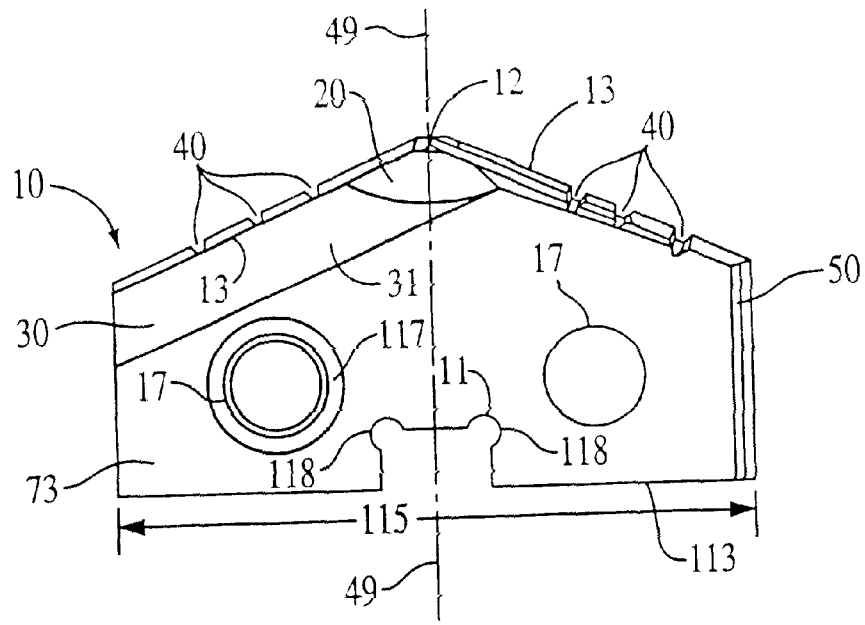
FIG. 2 is side view of the spade blade insert of FIG. 1.
Figure 3:
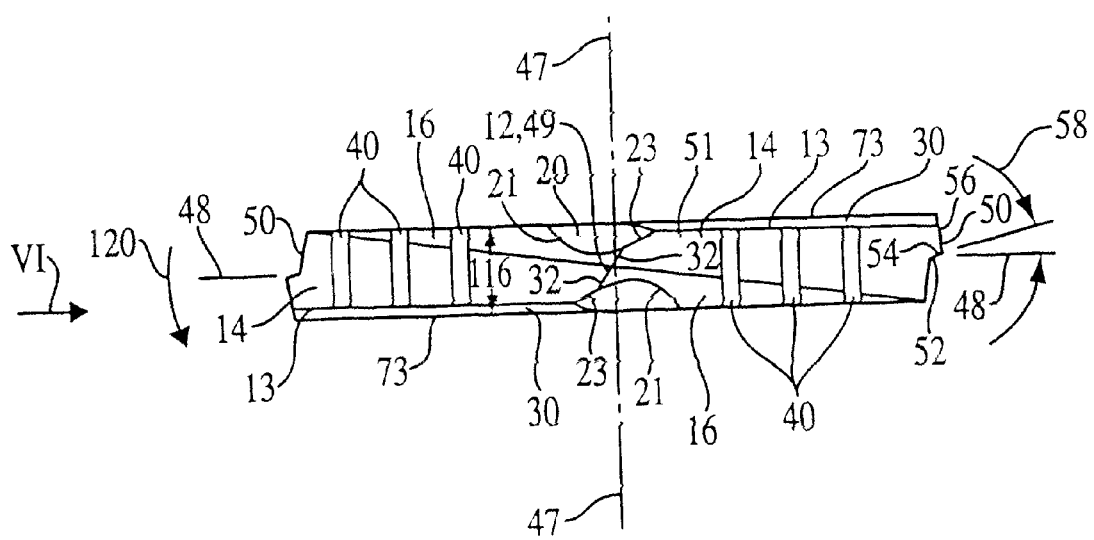
FIG. 3 is a point end view of the blade of FIG. 2.

Refer now to FIGS. 2 and 3, which show the spade blade insert 10 apart from the holder 101. The blade 10 has an apex 12, a pair of cutting edges 13, a pair of primary relief surfaces 14, a pair of secondary relief surfaces 16, a pair of web thinning notches 20, and a pair of flutes 30. The blade 10 has a width 116 between opposing parallel side faces 73 and a blade diameter 115. The flutes 30 are concave and their surface is referred to as the rake surfaces or faces 31. The intersection of the rake surface 31 and the primary relief surface 14 forms the primary cutting edge 13. The primary and secondary relief surfaces 14 and 16 meet at the apex 12 and extend to the insert side surfaces or lands 50. A plurality of chip splitting grooves 40 extend from the flutes 30 to interrupt the cutting edges 13 and the relief surfaces 14 and 16. In the embodiment shown, there are three straight grooves 40 on each side of the apex 12 and each of the six grooves 40 has a unique radial position with respect to the apex 12.

The intersection of the notch 20 and the primary relief surface 14 is called the notch lip 23. The intersection of the notch 20 and the secondary relief surface 16 is called the notch hook 21. With reference to FIG. 3, in use the blade 10 is rotated about its apex 12 in the direction of arrow 120. The notch lip 23 is primarily on the leading edge of the blade 10 during rotation and functions as a cutting edge. The hook 21 is primarily on the trailing side of the blade 10 during rotation. The intersection of the secondary relief surface 16 and the primary relief surface 14 on the opposite side of the apex 12 forms a leading cutting edge called the secondary cutting edge 32.

The blade recess 11 includes curved corner surfaces 118 formed to strengthen the corners of recess 11 against cracking. As shown in FIGS. 2 and 3, the blade 10 has a longitudinal axis of symmetry 49, a major axis 48, and a minor axis 47, all mutually prependicular. The major axis 48 is generally parallel to the cutting edges 13 and the blade side surfaces 73.

Figure 4:
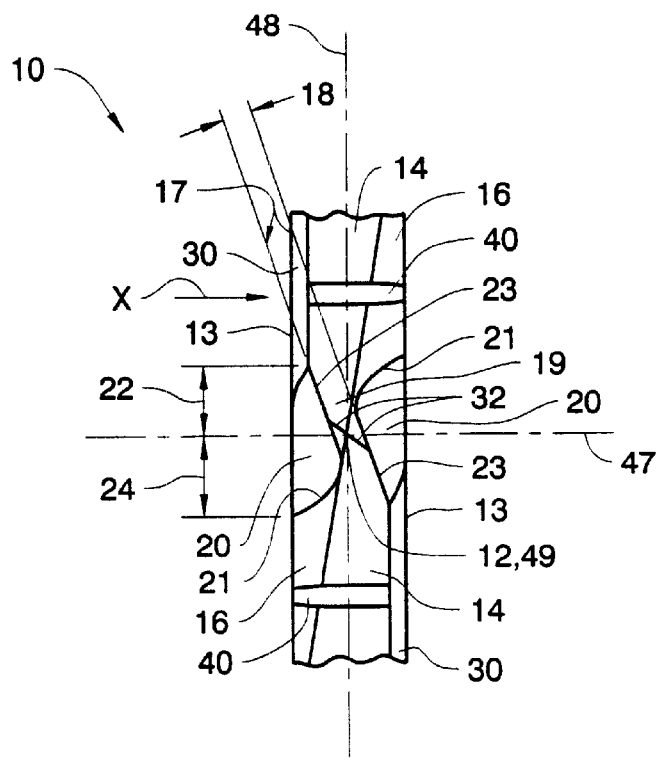
FIG. 4 is a partial close up view like FIG. 3.

With reference to FIG. 4, the notch lip length 22 is the length of the projection of notch lip 23 onto the plane of the paper of the view of FIG. 4 as measured from the axis 47, i.e., the plane defined by the axes 47 and 48, and which projection is in turn projected onto a plane normal to the plane of FIG. 4 and parallel to the edge 13, i.e., the plane defined by axes 48 and 49. The notch hook length 24 is the same projection of the notch hook 21. It is advantageous to control the ratio of the lip length 22 to the hook length 24 across a variety of diameters 115 of insert 10. Conventional inserts, or blades, generally utilize a constant hook length and a varying lip length, which consequently increases the lip length/hook length ratio as the insert diameter increases. The approximate values for the lip length/hook length ratio for the illustrated embodiment of insert 10 of various diameters as compared with conventional inserts is as follows:

| Series Number | Diameter Range (inches) | Insert 10 Lip length/ Hook length ratio | Conventional Blade Lip length/ hook length ratio |
| --- | --- | --- | --- |
| 0 | .511 to .695 | 1.10 | 0.76 |
| 1 | .690 to .950 | 1.05 | 1.09 |
| 2 | .961 to 1.380 | 1.06 | 1.20 |
| 3 | 1.353 to 1.882 | 1.16 | 1.86 |
| 4 | 1.850 to 2.570 | 1.06 | 2.04 |

Generally, as the lip length/hook length ratio decreases, slivers of cut material, called chips, formed by the cutting action of the lip cutting edges, become narrower and more likely to roll-up on themselves. This may cause the chips to crowd at the bottom of the blade flute and accelerate the wear at the blade rake face. This effect may become more pronounced for lip length/hook length ratios less than about one. As the lip length/hook length ratio increases, wider chips are produced because of a relatively longer lip cutting edge. However, there is less room for the wider chips to be removed from the vicinity of the cutting action because of the relatively short hook length. This effect may become more pronounced for lip length/hook length ratios greater than about one and one-third. Preferably, for the illustrated embodiment, the lip length/hook length ratio should be from about 1 to about 1.33 and more preferably from about 1.05 to about 1.2.

Figure 5:
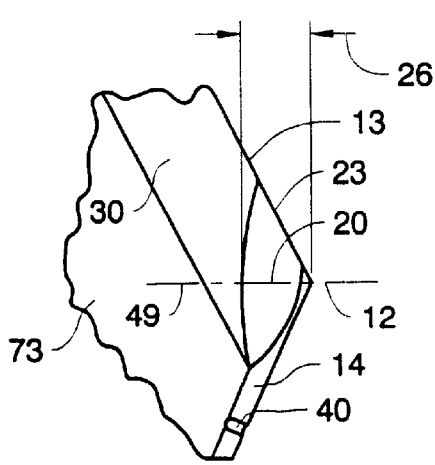
FIG. 5 is a partial close up view like FIG. 2.

An aspect of the described embodiment, as shown in FIG. 5, is that the notch 20 has a blended and more open form than notches of conventional spade blade inserts. As illustrated, the notch 20 has a hook length 24 which is greater than the depth of conventional notches. It is desirable that the notch that the hook length 24 be greater than or equal to the width of the rake face surface 31. Preferably, the hook length should be about 4 to about 6 percent greater than the width of the rake face, and can be about 6 to about 12 percent greater than the width of the rake face surface. Further, the notch 20 is defined by a variable curvature or a combination of curvatures, referred to as blended, to increase its length such that it completely crosses the flute 30. The blending may be accomplished through one or more grinding passes during manufacture of the insert 10.

By blending and making the notch 20 more open through increasing its depth 26, the evacuation of chips is enhanced. Further, chips are able to roll out across a larger surface area, increasing the heat transfer surface area, thus reducing the heat flux in the notch 20 (which may otherwise cause premature thermal failure of the insert 10 under high speed conditions). Finally, by widening the notch 20, the chips are allowed to flow along the entire face of the flute 30.

In the embodiment illustrated in FIG. 4, the planes containing the notch lip edges 23 are parallel to each other on either side of the apex 12. The angle between the edge 23 and the edge 13 is called the web angle 17. A web 19 has a web width 18 constituting the perpendicular distance between the lip edges 23. The web width 18 of the illustrated embodiment is generally thinner than conventional web widths. A thinner web 19 yields certain benefits, including increasing the penetration rate of the insert 10, allowing for deeper holes to be drilled, and decreasing the horsepower consumption because of a lowered thrust. Further, the accessibility for the insert 10 is widened to allow use with tools which have a lower power rating, or in other words, which would be under-powered for conventional spade blades.

The approximate values for the nominal width 18 of the web 19 of the insert 10 for various diameters as compared to conventional blades is as follows:

| Series Number | Diameter Range (inches) | Insert 10 Web Thickness (inches) | Conventional Blade Web Thickness (inches) |
|---|---|---|---|
| 0 | .511 to .695 | .025 | .030 |
| 1 | .690 to .950 | .028 | .035 |
| 2 | .961 to 1.380 | .035 | .040 |
| 3 | 1.353 to 1.882 | .047 | .054 |
| 4 | 1.850 to 2.570 | .058 | .066 |

The manufacturing tolerances for the web thickness of insert 10 are preferably about ±0.002 inch for each series of inserts 10. The web thicknesses of the conventional blades were determined by measurement of numerous conventional blades within each series. The manufacturing tolerances of the conventional blades are such that ninety-five percent or less of the conventional blades are within about ±0.003 inch of the thickness for each series. Consequently, the average reduction in web thickness 18 between the insert 10 of the illustrated embodiment and conventional blades is about ten percent for each series.

Figure 12:
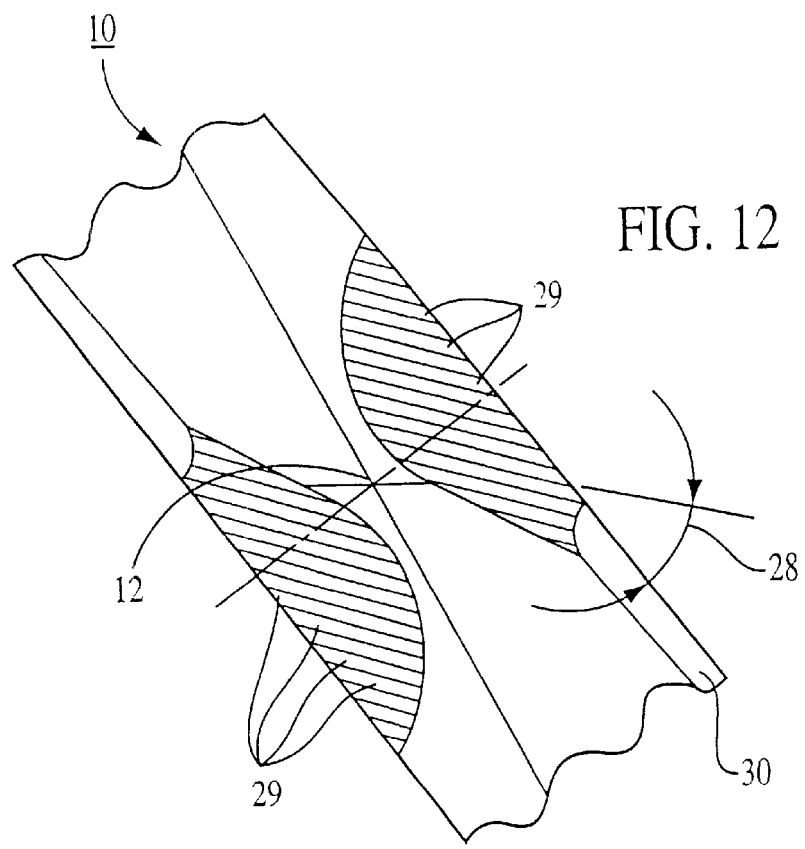
FIG. 12 is an enlarged point end view of the insert of FIG. 1 showing a notch grind angle.
Figure 18:
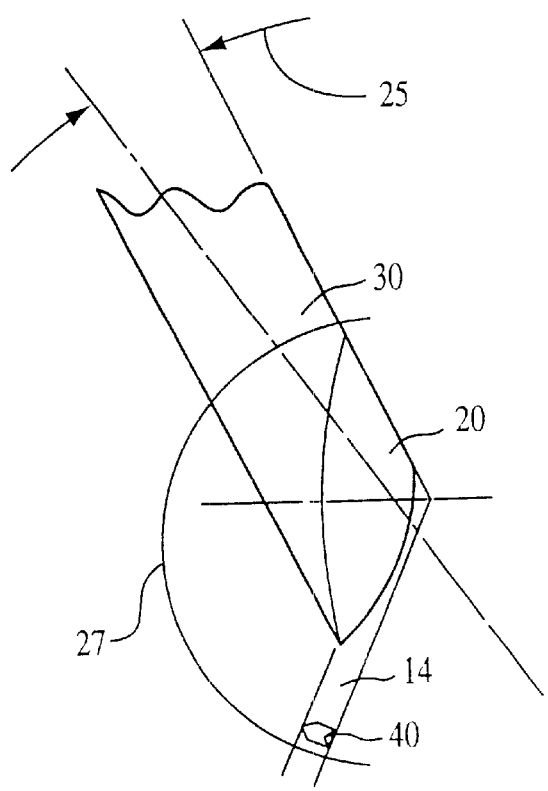
FIG. 18 is a view like FIG. 5.

With reference to FIGS. 12 and 18, another aspect of the described embodiment is a reduced notch grind angle 28. Moreover, the notch grind angle varies with the diameter of the blade 10 or series of blades 10. The notch grind angle 28 is determined relative to a tilt angle 25 and an apex angle 27. Reducing and varying the notch grind angle facilitates achievement of the lip length/hook length ratio and the achievement of the open blended notch 20 extending to the back of the rake face. The notch grind angle for the described embodiment is from about 18 to about 25 degrees and may be adapted to achieve the desired notch form.

The approximate values for the nominal notch grind angle of the insert 10 for various diameters as compared to conventional blades is as follows:

| Series Number | Diameter Range (inches) | Insert 10 Grind angle (degrees) | Conventional Blade Grjnd angle (degrees) |
|---|---|---|---|
| 0 | 511 to .695 | 20 | 25 |
| 1 | .690 to .950 | 19 | 24 |
| 2 | .961 to 1.380 | 20 | 25 |
| 3 | 1.353 to 1.882 | 23.5 | 24 |
| 4 | 1.850 to 2.570 | 23.5 | 26 |

Figure 13:
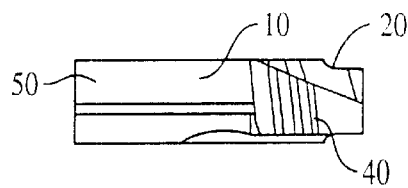
FIG. 13 is a side view of the insert of FIG. 1.

To determine the notch grind angle 28, rotate the FIG. 4 insert 10 about its apex 12 by ninety degrees. Next, rotate the apex 12 clockwise by an angle equal to the apex angle 27 and the tilt angle 25 (FIG. 13). The apex angle 27 is about 132 degrees for the illustrated embodiment. The tilt angle 25 is the angle at which the notch 20 is ground relative to the apex angle 27, but in the plane of the notch grind angle 28. In the plane of the notch grind angle 28, the tilt angle 25 has a value of about seven degrees, while the tilt angle 25 is about nine degrees measured relative to one of the flat surfaces of the blade 10.

After rotating the apex 12 clockwise an angle equal to the apex angle 27 and the tilt angle 25, rotate the insert 10 in a direction into the page until the grind lines 29 (FIG. 12) are horizontal with respect to a set of cross hairs defined within a laboratory reference frame. The angle between the grind lines 29 and the projected, but rotated, sides 13 of the blade 10 defines the notch grind angle 28. The notch grind angle 28 is dependent upon the insert 10 diameter range (series), as opposed to conventional blades which incorporate a constant notch grind angle. Preferably, the notch grind angle is about twenty degrees. The optimum notch 20 for chip evacuation and control is not compromised by the diameter of the blade 10, i.e., the notch form is sustained over all diameters of the inserts 10.

The method for making a blended notch 20 is an iterative process which is a function of the wheel form, the blade 10 size, the width of the flute 30, sustaining the lip length/hook length ratio, and ensuring that the form of the notch 20 is generally concave back from the cutting edge 13.

Figure 16:
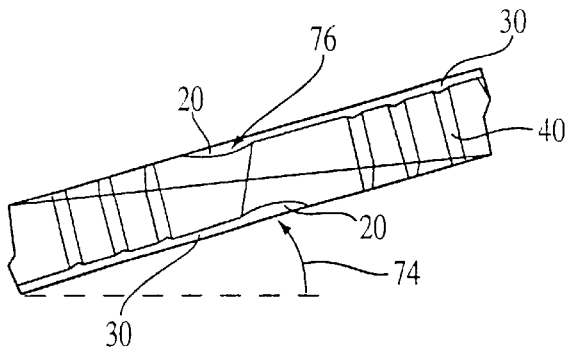
FIG. 16 is a point end view of the insert of FIG. 1.
Figure 14:
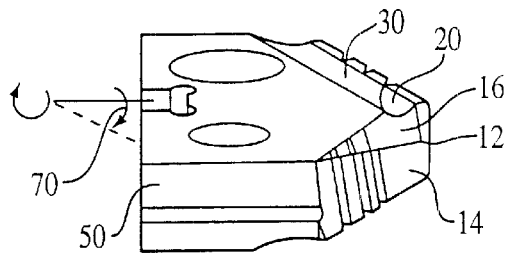
FIG. 14 is a perspective view of the insert of FIG. 1.
Figure 17:
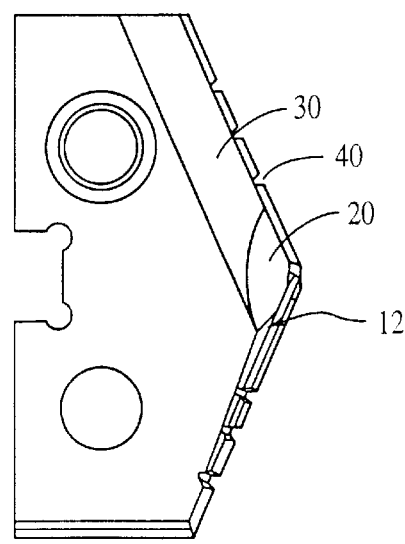
FIG. 17 is another side view of the insert of FIG. 1.
Figure 15:
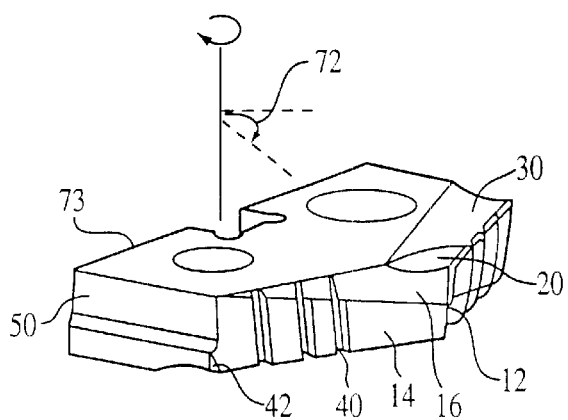
FIG. 15 is another perspective view of the insert of FIG. 1.

Next will be described the method for making a blended notch 20 with reference to FIGS. 13 through 17. With the blade 10 in the position as shown in FIG. 13, the side 50 shown is rotated downwardly by the angle 70, as shown in FIG. 14. Next, the back face 73 of the insert 10 is rotated clockwise by angle 72 (FIG. 15). With the insert 10 in the position shown in FIG. 16, a grinding wheel (not shown) grinds downwardly in the direction 76 at the angle 74 (FIG. 16) to form the notch 20. The insert 10 is shown in FIG. 16 as rotated through angle 74 only to define the angle between the wheel and the insert 10 as depicted in FIG. 15. During the grinding process, the insert 10 is actually in the position shown in FIG. 15. The position of the wheel allows the notch 20 to be blended to form the width of the rake face (flute 30), as shown in FIG. 17 at point 12.

With specific reference to FIG. 3, the side surfaces 50 of the insert 10 include a lip 52, a first lip surface 54 and a second lip surface 56. The clearance angle 58, between the lip surfaces 54 and 56 is smaller than the clearance angle of conventional blades. Conventional blades have a clearance angle between about 38 and 40 degrees, whereas the clearance angle 58 of the insert 10 is approximately 30 degrees. The smaller clearance relief angle 58 reduces chip packing between the spade blade body and the sidewall of the hole being drilled.

Figure 6:
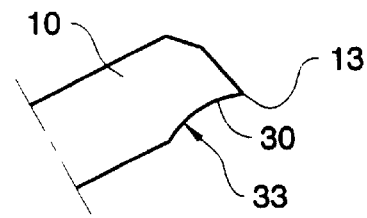
FIG. 6 is view taken in the direction of arrow VI of FIG. 3.
Figure 7:
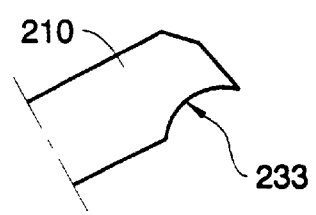
FIG. 7 is a view like FIG. 6 of a conventional blade feature.

Another aspect of the described embodiment, as illustrated in FIGS. 6 and 7, is that the flutes 30 of the insert 10 have an elliptical flute form 33, in contrast to a conventional radial flute form 233 of blade 210. The elliptical form 33 yields a flatter and thinner chip, in contrast to the radial form 233, which may be more likely to result in chip curling and packing. Further, the flutes 30 may have their edges 13 "broken" or ground to prevent fracturing of the insert 10 during use. As shown in FIGS. 8 and 9, a rounded K-land hone 61 is formed on the edge 13 of the flute 30. The rounded K-land hone 61 has a width 15 and an angle 60. As shown in FIG. 9, a nominal K-land hone 63 is formed on the edge of the flute 30. The nominal K-land hone 63 has a width 15 and an angle 60. Honing the cutting edge 13 may increase the life of the tool as described in U.S. Pat. No. 5,609,447, incorporated herein by reference.

The approximate values for the K-land hones of the insert 10 for various diameters is as follows:

| Series Number | Diameter Range (inches) | Insert 10 K-Land width range (inches) |
|---|---|---|
| 0 | .511 to .695 | .001 to .003 |
| 1 | .690 to .950 | .001 to .003 |
| 2 | .961 to 1.380 | .002 to .004 |
| 3 | 1.353 to 1.882 | .003 to .005 |
| 4 | 1.850 to 2.570 | .004 to .006 |

The K-land angle preferably ranges from about 0 to about 40 degrees, and more preferably from about 15 to about 25 degrees.

Another aspect of the described embodiment is that the chip splitters 40 of the insert 10 as shown in FIG. 10 are wider and rounder in cross-sectional form through the depth 42 than conventional spade blades, as shown in FIG. 11. The conventional spade blade notch 240 has a profile defined by an angle 245 through a portion of its depth 242 and width 244 and further defined by a relatively narrow radius at its bottom. A wider and rounder profile decreases the likelihood that the chips will hang up in the chip splitters 40 themselves and thus adds to the life of the blade 10.

The following examples provide further supporting basis for the above description of the insert 10.

EXAMPLE 1

Uncoated 1⅛ inch spade blades were run as follows:

Vertical drilling, 80 sfm, 0.010 inches/revolution (ipr), coolant=16:1 water soluble coolant, 1.95" blind hole into 4140 steel@280±15 Brinell hardness number (Bhn).

A conventional blade yielded an average of 56 holes.

A blade having a thinned web 19 and an open blended notch 20, with no other above-described characteristic geometric changes, i.e., was otherwise conventional, yielded an average of 85 holes.

A blade having the more rounded chip splitters 40, with no other above-described characteristic geometric changes, yielded an average of 72 holes.

EXAMPLE 2

Titanium nitride (TiN) coated 1½ inch spade blades were run as follows:

Vertical drilling, 88 sfm, 0.008 ipr, coolant=16:1 water soluble coolant, 4340 steel@285±10 Bhn.

A conventional blade drilled an average of 97 holes.

A blade including all of the described geometric characteristics of the insert 10, with the exception that the lip length/hook length ratio equaled 1.38 and the blade lacked the described open blended notch form, drilled an average of 75 holes.

A blade including all of the described geometric characteristics of the insert 10 yielded an average number of 126 holes.

EXAMPLE 3

Titanium nitride (TiN) coated ¾ inch spade blades were run as follows:

Vertical drilling, 196 sfm. 0.008 ipr, coolant=16:1 water soluble coolant, 4150 steel@285±10 Bhn.

A conventional blade averaged 114 holes.

A blade including all of the described geometric characteristics of the insert 10 averaged 144 holes.

EXAMPLE 4

Titanium nitride (TiN) coated 1⅛ inch spade blades were run as follows:

Vertical drilling, 118 sfm, 0.016 ipr, coolant=16:1 water soluble coolant, 4150 steel@285±10 Bhn.

A conventional blade averaged 144 holes.

A blade including all of the described geometric characteristics of the insert 10, inclusive of a nominal K-land hone 63, averaged 186 holes.

A blade including all of the described geometric characteristics of the insert 10, inclusive of a rounded K-land hone 61, averaged 216 holes.

The K-land angle 60 was twenty degrees and the width 15 was 0.003 inches ±0.001 inches.

The described embodiments allow for an insert which provides higher penetration rates, lower horsepower consumption and deeper holes, while enhancing its accessibility to underpowered machines.

Further, the described embodiments provide an insert with enhanced chip evacuation, a reduced heat flux due to an increased heat transfer surface area, and reduced chip packing and curling.

The above description and drawings are only illustrative of preferred embodiments of the present invention, and are not intended to limit the present invention thereto. For example, an embodiment shown has six asymmetrically arranged chip splitting grooves, however the invention is not limited to these arrangements. Also, for example, a described embodiment includes a spade blade mounted in the holder in a specific manner. However other mounting arrangements could be used. Any subject matter or modification thereof which comes within the spirit and scope of the following claims is to be considered part of the present invention.

What is claimed is:

1. A spade drill comprising:
    a spade blade holder having a recessed portion and a pin on an upper surface of said recessed portion;
    a spade blade affixed to said spade blade holder, said spade blade having a longitudinal cutting axis and a recess on a bottom surface for accepting said pin opposing side faces, lands and point surfaces formed along a point edge, said point surfaces including a primary relief surface and a secondary relief surface, said primary relief surface and said secondary relief surface intersecting and extending from an apex of said point edge to an intersection of said land and said side face;
    wherein said spade blade has at least one web thinning notch, said at least one notch having a hook edge with a hook length and a lip edge with a lip length, wherein the lip length to hook length ratio of said notch is about 1 to about 1⅓.

2. The spade drill of claim 1, wherein said recess is larger than said pin such that when said spade blade is mounted in said spade blade holder at least one longitudinal gap exists between said pin and said recess.

3. The spade drill of claim 1, wherein the lip length to hook length ratio of said notch is about 1.05 to about 1.20.

4. The spade drill of claim 1, wherein said spade blade has a K-land hone.

5. The spade drill of claim 4, wherein said K-land hone has an angle of about 0 to about 40 degrees.

6. The spade drill of claim 4, wherein said K-land hone has an angle of about 15 to about 25 degrees.

7. The spade drill of claim 2, wherein said notch is formed by blending.

8. The spade drill of claim 2, wherein said spade drill blade has at least one rake surface, said notch being formed in said rake surface.

9. The spade drill of claim 8, wherein said rake surface has an elliptical flute form.

10. The spade drill of claim 8, wherein the hook length of said notch is greater than or equal to the width of said rake face.

11. The spade drill of claim 8, wherein the hook length of said notch is about 4 to about 12 percent greater than the width of said rake face.

12. The spade drill of claim 8, wherein the hook length of said notch is about 4 to about 6 percent greater than the width of said rake face.

13. The spade drill of claim 8, further comprising at least first and second rake faces and at least first and second notches on respective of said rake faces.

14. The spade drill of claim 13, wherein said spade drill blade has a web width defined by the distance between said lip edges of said first and second notches.

15. The spade drill of claim 2, wherein said notch has a variable notch grind angle.

16. The spade drill of claim 15, wherein said notch has a notch grind angle of about 18 to about 25 degrees.

17. A spade drill comprising:
   a spade blade holder;
   a spade blade affixed to said spade blade holder, said spade blade having opposing side faces, lands and point surfaces formed along a point edge, said point surfaces including a primary relief surface and a secondary relief surface, said primary relief surface and said secondary relief surface intersecting and extending from an apex of said point edge to an intersection of said land and said side face and at least one web thinning notch, and said notch having a hook edge with a hook length and a lip edge with a lip length; and
   wherein the lip length to kook length ratio of said notch is about 1 to about 1⅓.

18. The spade drill of claim 17, wherein the lip length to hook length ratio of said notch is about 1.05 to about 1.20.

19. The spade drill of claim 17, wherein said spade blade has a K-land hone.

20. The spade drill of claim 19, wherein said K-land hone has an angle of about 0 to about 40 degrees.

21. The spade drill of claim 19, wherein said K-land hone has an angle of about 15 to about 25 degrees.

22. The spade drill of claim 17, wherein said notch is formed by blending.

23. The spade drill of claim 17, wherein said spade drill blade has at least one rake surface, said notch being formed in said rake surface.

24. The spade drill of claim 23, wherein said rake surface has an elliptical flute form.

25. The spade drill of claim 17, wherein said rake surface is generally concave.

26. The spade drill of claim 23, wherein the hook length of said notch is from about 4 to about 12 percent greater than the width of said rake face.

27. The spade drill of claim 23, wherein the hook length of said notch is about 4 to about 6 percent greater than the width of said rake face.

28. The spade drill of claim 17, further comprising at least first and second rake faces and at least first and second notches on respective of said rake faces.

29. The spade drill of claim 28, wherein said spade drill blade has a web width defined by the distance between said lip edges of said first and second notches.

30. The spade drill of claim 17, wherein said notch has a variable notch grind angle.

31. The spade drill of claim 17, wherein said notch has a variable notch grind angle of about 18 to about 25 degrees.

32. The spade drill of claim 17, wherein said spade blade holder has a recessed portion and a pin on an upper surface of said recessed portion, said spade blade has a longitudinal cutting axis and a recess on a bottom surface for accepting said pin, and wherein said recess is larger than said pin such that when said spade blade is mounted in said spade blade holder a longitudinal gap exists between said pin and said recess.

33. A spade drill comprising a fluted barrel holding portion having a holder point end, a spade blade insert affixed to said holder point end, said insert having point surfaces formed along a point edge, said point surfaces including a primary relief surface and a secondary relief surface, said relief surfaces extending from the apex of said point edge to the outer diameter of said insert, a laterally extending flute forming a rake surface intersecting the primary relief surface to form a primary cutting edge, a web thinning notch formed across said flute at said apex, said notch being concave across its entire width, said notch being blended to form a concave profile, a plurality of chip splitting grooves extending from said flute to interrupt said primary cutting edge and said primary and secondary relief surfaces, said notch having a hook length and a lip length, the lip length to hook length ratio being from about one to about one and one third.

34. The spade drill of claim 33, wherein the hook length of said notch is greater than or equal to the width of said rake face.

35. The spade drill of claim 33, wherein the hook length of said notch is from about 4 to about 12 percent longer than the width of said rake face.

36. The spade drill of claim 33, wherein the hook length of said notch is from about 4 to about 6 percent longer than the width of said rake face.

37. A spade drill blade, said spade drill blade comprising:
   opposing side faces, lands and point surfaces formed along a point edge, said point surfaces including a primary relief surface and a secondary relief surface, said primary relief surface and said secondary relief surface intersecting and extending from an apex of said point edge to an intersection of said land and said side face;
   at least one web thinning notch, said notch having a hook edge with a hook length and a lip edge with a lip length, wherein the lip length to hook length ratio of said notch is about 1 to about 1⅓.

38. The spade drill blade of claim 37, wherein the lip length to hook length ratio of said notch is about 1.05 to about 1.20.

39. The spade drill blade of claim 37, wherein said spade blade has a K-land hone.

40. The spade drill of claim 39, wherein said K-land hone has an angle of about 0 to about 40 degrees.

41. The spade drill of claim 39, wherein said K-land hone has an angle of about 15 to about 25 degrees.

42. The spade drill blade of claim 37, wherein said notch is formed by blending.

43. The spade drill blade of claim 37, wherein said spade drill blade has at least one rake surface, said notch being formed in said rake surface.

44. The spade drill of claim 43, wherein said rake surface has an elliptical flute form.

45. The spade drill of claim 43, wherein said rake surface is generally concave.

46. The spade drill blade of claim 43, wherein the hook length of said notch is from about 4 to about 12 percent greater than the width of said rake face.

47. The spade drill blade of claim 43, wherein the hook length of said notch is about 4 to about 6 percent greater than the width of said rake face.

48. The spade drill blade of claim 37, further comprising at least first and second rake faces and at least first and second notches on respective of said rake faces.

49. The spade drill blade of claim 48, wherein said spade drill blade has a web width defined by the distance between said lip edges of said first and second notches.

50. The spade drill blade of claim 37, wherein said notch has a variable notch grind angle.

51. The spade drill blade of claim 50, wherein said notch has a variable notch grind angle of about 18 to about 25 degrees dependent upon the diameter of said spade blade drill.

52. The spade drill blade of claim 51, wherein said notch has a variable notch grind angle of about 18 to about 25 degrees.

53. A method of forming a spade blade drill, said method comprising the steps of:

forming a spade blade holder having a recessed portion and a pin on an upper surface of said recessed portion;

forming a spade blade having opposing side faces, lands and point surfaces formed along a point edge, said point surfaces including a primary relief surface and a secondary relief surface, said primary relief surface and said secondary relief surface intersecting and extending from an apex of said point edge to an intersection of said land and said side face, said spade blade having a longitudinal cutting axis and a recess on a bottom surface for accepting said pin, said recess being larger than said pin;

forming a blended notch on said blade, wherein said step of forming said blended notch comprises the step of grinding said spade blade such that the lip length to hook length ratio of said notch is about 1 to about 1⅓; and mounting said spade blade to said spade blade holder such that when said spade blade is mounted in said spade blade holder a longitudinal gap exists between said pin and said recess.

54. A method of forming a spade drill blade, said method comprising the steps of:

forming a spade drill blade having opposing side faces, lands and point surfaces formed along a point edge, said point surfaces including a primary relief surface and a secondary relief surface, said primary relief surface and said secondary relief surface intersecting and extending from an apex of said point edge to an intersection of said land and said side face, and a blended notch by grinding said spade blade such that the lip length to hook length ratio of said notch is about 1 to about 1⅓.

55. The method of claim 54, where said step of forming said blended notch comprises the step of grinding said spade blade such that the hook length of said notch is from about 4 to about 12 percent greater than the width of a rake face of said spade blade.

56. The spade drill of claim 54, where said step of forming said blended notch comprises the step of grinding said spade blade such that the hook length of said notch is about 4 to about 6 percent greater than the width of a rake face of said spade blade.

57. The method of claim 53, where said step of forming said blended notch comprises the step of grinding said spade blade such that the hook length of said notch is from about 4 to about 12 percent greater than the width of a rake face of said spade blade.

58. The method of claim 53, where said step of forming said blended notch comprises the step of grinding said spade blade such that the hook length of said notch is about 4 to about 6 percent greater than the width of a rake face of said spade blade.

\* \* \* \* \*